2,788,283
Patented Apr. 9, 1957

2,788,283

PROCESS FOR TREATING FLUID DAIRY PRODUCTS AND PRODUCT PRODUCED THEREBY

Aubrey P. Stewart, Jr., Berkeley, Donald F. Wilcox, Gustine, and Robert A. Johnson, San Jose, Calif., assignors, by mesne assignments, to Foremost Dairies, Inc., Oakland, Calif., a corporation of New York Application September 8, 1951, Serial No. 245,716

5 Claims. (Cl. 99—213)

This invention relates to a new and improved process for treating fluid milk and cream and the like, according to which a sterilized finished product is produced which has a concentration of nonfat constituents which is substantially the same as that of natural fresh milk or cream, as the case may be, and which possesses a flavor more closely resembling the flavor of natural milk or cream, and which at the same time possesses an unusually high resistance to staling.

The term "fluid milk products" as used hereinafter refers to milk, with or without butter fat or other substance also being present and without regard to the quantity thereof if present, which has a solids makeup and concentration substantially the same as that of the nonfat portion of natural fresh milk.

An understanding of this invention will be more readily acquired when it is known that for many years attempts have been made by numerous investigators to preserve fluid milk products by methods which will yield products comparable in quality to fresh daily products. These methods have included dehydration, freezing, and sterilizing. In view of the fact that the present invention concerns itself with the production of a sterilized product, the following discussion will be restricted to prior art practices involving sterilizaton.

In the past, it has been the customary practice to sterilize milk, cream, and evaporated milk in sealed cans. This practice (Condensed Milk and Milk Powder, O. F. Hunziker, 6th edition, 1946, pp. 231 and 232) requires approximately 15 to 20 minutes to raise the temperature of the milk in the can to approximately 240° F.–245° F., thereafter the temperature is maintained at 240° F.–245° F. for 15 to 20 minutes and then the cans are cooled to approximately 70° F. to 80° F. over a period of approximately 10 to 15 minutes.

This procedure, however, yields products which have so much cooked flavor that their acceptance by the public, compared with fresh products, is seriously limited. This difficulty arises from the fact that relatively high temperatures for long treatment periods are required in order to cause the heat necessary for sterilization to penetrate into the center of the can and thereby reach the entire contents of a can undergoing treatment. Procedures involving the agitation of the can during sterilization treatment have not permitted the time-temperature ratio to be reduced adequately to avoid a relatively high degree of cooked flavor.

It has been recognized for a number of years that cooked flavor may be lessened if sterilization were conducted at higher temperatures for shorter periods of time (Condensed Milk and Milk Powder, O. F. Hunziker, 6th edition, 1946, p. 254). The practice of this method has not been widespread because of difficulties hereinafter mentioned, as well as the lack of commercial equipment to aseptically package the sterilized fluid. High-temperature-short-time sterilization is usually conducted by passing the fluid through heating equipment designed to quickly raise the temperature to approximately 285° F. followed by a holding period sufficient to sterilize the fluid. This holding period necessary for sterilization will vary depending on residence time in passing through the sterilizing heater and type of heater, but is usually less than 30 seconds. The sterile fluid is then aseptically introduced into previously sterilized containers and sealed therein. Apparatus such as that described in U. S. Patent No. 2,549,216, "Apparatus and Method for Preserving Products in Sealed Containers," W. McK. Martin, April 17, 1951, may be used.

Notwithstanding the fact that high-temperature-short-time sterilization has been found to reduce the cooked flavor that is developed in the product, nevertheless difficulty has been experienced in producing good quality products by such processes, and as far as is known, the difficulties so encountered have not been solved except through the procedures constituting the present invention. The difficulties referred to are described by B. H. Webb, Food Industries, heat sterilized milk and cream, have a heated (cooked) flavor initially and on storage develop a stale flavor.

Although the cooked flavor of high-temperature-short-time sterilized milk products is considerably less than that of in-the-can sterilized products, it is still objectionable to many consumers. Similarly, the stale flavor which develops on storage is also objectionable.

A method of processing has now been discovered, according to which cooked flavor may be practically eliminated and the development of stale flavor on storage reduced to a point where it is substantially undetectable.

This invention proceeds upon the discovery that the substances present in products of this type which give to the product its cooked flavor can be oxidized, with the result that the objectionable cooked flavor is eliminated, and upon the further discovery that with high-temperature-short-time sterilization the production of cooked flavor substances can be held to a quantity which permits their ready removal by such oxidation treatment. The invention is based upon the further discovery that by proper control of the oxidizing procedure, according to which the cooked flavor substances are eliminated, all available oxygen present in the product, such as would otherwise substantially react with constituents of the product to produce stale flavor substances, can be eliminated from the product, with the result that the finished product is not only free from cooked flavor but also is stable with respect to the tendency to develop a stale flavor.

Accordingly, this invention concerns itself with the controlled and calculated use of oxygen to react with cooked-flavor substances produced during sterilization in order to change these substances to substances having a non-cooked flavor. The process is so controlled as to not allow excess oxygen, over and above that necessary to react with the cooked flavor substances, since such excess oxygen has been found to result in the development of stale flavor on storage. Thus, there are two reactions involved, as follows:

(A)
Cooked-flavor-substances+oxygen (reduced form)→
      non-cooked-flavor substances (oxidized form)
(B)
Substances unknown+oxygen→stale-flavor substances Reaction A proceeds at a faster rate than does Reaction B, so that if just sufficient oxygen is present in the milk to essentially complete Reaction A, then Reaction B will not take place to any practical extent. As a result, it is possible to produce heat sterilized milk and cream with practically no cooked flavor and also without the development of a stale flavor.

In the actual practice of the invention, analytical techniques are important to determine the amount of oxygen required to react with any given amount of cooked-flavor reducing substances without leaving an excess of oxygen to produce staling. Accordingly, the porphyrexide method (A. P. Stewart, Jr., August 1951 issue of Journal of Dairy Science) may be employed to measure cooked-flavor reducing substances, and the polarograph method (G. H. Hartman and O. F. Garrett, Ind. & Eng. Chem., Anal. Ed. 14: 641–644 (1942)) may be employed to measure dissolved oxygen concentration.

In the following Table I there is shown the correlation between cooked-flavor reducing substances, measured by the porphyrexide method, and the actual cooked flavor scores measured organoleptically.

In Table II are shown the amounts of cooked-flavor reducing substances produced by various high-temperature-short-time sterilizing conditions.

In Table III are shown the amounts of oxygen required to react with cooked-flavor reducing substances without excessive oxygen such as will cause staling.

In Table IV are shown the rates at which oxygen reacts with cooked-flavor reducing substances.

TABLE I

*Relationship between cooked flavor and cooked-flavor reducing substances as measured by the porphyrexide method*

Evaporated milk, freshly sterilized by conventional in-the-can processing, come-up time 15 minutes to 208° F., sterilization 245° F. for 12 minutes, cooling 8 minutes to 85° F., was diluted with an equal volume of water. The diluted evaporated milk was then mixed in various proportions by volume with fresh homogenized milk, HTST pasteurized at 161° F. for 15 seconds, and cooked-flavor scores assigned as indicated.

| Percent Pasteurized Milk | Percent Diluted Evaporated Milk | Cooked Flavor Score | Porphyrexide [1] Reducing Substances expressed as mg. Ascorbic Acid/Liter |
|---|---|---|---|
| 100 | 0 | 0 | 10 |
| 95 | 5 | ½+ | 15.5 |
| 90 | 10 | 1+ | 21 |
| 85 | 15 | 1½+ | 26.5 |
| 80 | 20 | 2+ | 32 |
| 75 | 25 | 2½+ | 37.5 |
| 70 | 30 | 3+ | 43 |
| 65 | 35 | 3½+ | 48.5 |
| 60 | 40 | 4+ | 54 |
| 55 | 45 | 4½+ | 59.5 |
| 50 | 50 | 5+ | 65 |
| 45 | 55 | 5½+ | 70.5 |

[1] Porphyrexide reducing substances includes 10 mg. per liter actual ascorbic acid present in pasteurized milk.

TABLE II

*Relationship between high-temperature-short-time sterilization conditions and production of cooked flavor reducing substances. Milk deaerated prior to heating*

| Residence Time (seconds) | | | | | Outlet Temperature of Sterilizer, °F. | Residence Time After Sterilizer Before Cooling (seconds) | Sterilization [1] Value F₀ | Reducing Substances mg./liter as ascorbic acid |
|---|---|---|---|---|---|---|---|---|
| In Preheater Outlet Temperature 190° F. | Between Preheater and Deaerator, 190° F. | In Deaerator Outlet Temperature 178° F. | Between Deaerator and Sterilizer, 178° F. | In Sterilizer | | | | |
| 82 | 25 | 29 | 28 | 27 | 270 | 20 | 5.6 | 44 |
| 82 | 25 | 29 | 28 | 27 | 280 | 5 | 8.9 | 44 |
| 82 | 25 | 29 | 28 | 27 | 285 | 1 | 10.2 | 44 |
| 82 | 25 | 29 | 28 | 27 | 275 | 23 | 12.1 | 48 |
| 82 | 25 | 29 | 28 | 27 | 280 | 11 | 13.5 | 48 |
| 82 | 25 | 29 | 28 | 27 | 285 | 5 | 16.6 | 48 |
| 82 | 25 | 29 | 28 | 27 | 290 | 1 | 19.8 | 48 |
| 82 | 25 | 29 | 28 | 27 | 280 | 25 | 24.4 | 52 |
| 82 | 25 | 29 | 28 | 27 | 285 | 12 | 26.9 | 52 |
| 82 | 25 | 29 | 28 | 27 | 290 | 5 | 31 | 52 |
| 82 | 25 | 29 | 28 | 27 | 295 | 1 | 34.5 | 52 |
| 82 | 25 | 29 | 28 | 27 | 290 | 16 | 61.8 | 58 |
| 82 | 25 | 29 | 28 | 27 | 295 | 8 | 74 | 58 |
| 82 | 25 | 29 | 28 | 27 | 290 | 31 | 104 | 64 |
| 82 | 25 | 29 | 28 | 27 | 295 | 15 | 111 | 64 |

[1] Time-temperature relationship productive of sterilization values (F₀) of at least 5 are considered necessary for sterilization.

TABLE III

*Relationship between initial cooked-flavor reducing substances, initial dissolved oxygen, final cooked-flavor reducing substances and flavor after storage fluid whole milk*

| Test No. | Initial Reducing Substances Immediately After Sterilization and Canning (Calculated as mg. Ascorbic Acid per liter) | Dissolved Oxygen Content Immediately After Sterilization and Canning (Percent Saturation at 25 C.) | Final Reducing Substances Measured After Storage at 72° F. for 3 months (as mg. ascorbic acid per liter) | Calculated Final [1] Reducing Substances (as mg. Ascorbic Acid per liter) | Flavor Score [3] Original | | After 3 months at 72° F. | |
|---|---|---|---|---|---|---|---|---|
| | | | | | Cooked | Stale | Cooked | Stale |
| 1A | 44 | 15 | 24 | 27 | (3+) | none | 1½+ | none. |
| 1B | 44 | 25.5 | 19 | 24 | (3+) | ...do... | 1+ | v. slight. |
| 2A | 43 | 6.6 | 30 | 28.5 | (3+) | ...do... | (2+) | none. |
| 3A | 45.5 | 11 | 29.5 | 28.5 | (3+) | ...do... | (2+) | Do. |
| 3B | 45.5 | 16.5 | 28 | 27 | (3+) | ...do... | 1½+ | Do. |
| 3C | 45.5 | 25 | 25 | 24.5 | (3+) | ...do... | 1½+ | Do. |
| 3D | 45.5 | 30.5 | 22.5 | 23 | (3+) | ...do... | 1+ | Do. |
| 3E | 45.5 | 42 | 18.5 | 20 | (3+) | ...do... | 1+ | (slight). |
| 4A | 50 | 9 | 29 | 30.5 | (3½+) | ...do... | (2+) | none. |
| 4B | 50 | 25 | 24 | 26 | (3½+) | ...do... | 1½+ | Do. |
| 4C | 50 | 40 | 20 | 22 | (3½+) | ...do... | 1+ | v. slight. |
| 4D | 50 | 55 | 15 | 17.5 | (3½+) | ...do... | ½+ | (definite). |
| 5A | 53 | 4 | 32 | 33 | (4+) | ...do... | (2+) | none. |
| 5B | 53 | 7 | 30 | 32 | (4+) | ...do... | (2+) | Do. |
| 5C | 53 | 15 | 29 | 30 | (4+) | ...do... | (2+) | Do. |
| 5D | 53 | 25 | 25 | 27 | (4+) | ...do... | 1½+ | Do. |
| 5E | 53 | 37.5 | 21 | 23.5 | (4+) | ...do... | 1+ | v. v. slight. |
| 6A | 65 | 5 | 33.5 | 34.5 | (5+) | ...do... | (2+) | none. |
| 6B | 65 | 19 | 32.5 | 30.5 | (5+) | ...do... | (2+) | Do. |
| 6C | 65 | 31.5 | 28 | 27 | (5+) | ...do... | 1½+ | Do. |
| 6D | 65 | 36.5 | 26.5 | 26 | (5+) | ...do... | 1½+ | Do. |
| 6E | 65 | 42 | 22.5 | 24 | (5+) | ...do... | 1+ | Do. |

[1] Calculated according to formula: [Final R. S.] = [Original R. S.] × [1 − (.0068 × Original R. S.)] − [.28 × (percent $O_2$ saturation at 25° C.)].

[3] Scores in parenthesis indicate flavor regarded to be unsatisfactory for good consumer acceptance.

TABLE IV

*Rate of reaction of cooked-flavor reducing substances with oxygen*

| Test No. | Storage Time at 72° F. | Dissolved Oxygen, Percent Saturation at 25° C. | Cooked-Flavor Reducing Substances, mg./liter as Ascorbic Acid |
|---|---|---|---|
| I | Immediately after Steril. and Canning. | 42 | 65 |
| I | 3 days | | 38.5 |
| I | 6 days | 5 | 30 |
| I | 2 weeks | | 27 |
| I | 4 weeks | 0 | 22.5 |
| I | 2 months | | 22.5 |
| I | 3 months | | 22.5 |
| II | Immediately after Steril. and Canning. | 30.5 | 45.5 |
| II | 3 days | | 32 |
| II | 7 days | 9 | 30 |
| II | 2 weeks | | 24 |
| II | 4 weeks | 0 | 22.5 |
| II | 2 months | | 22.5 |
| II | 3 months | | 22.5 |

Whereas this invention may be practiced according to various procedural steps, one satisfactory method which has been found to give good results will now be set forth by way of example. This illustrative process may be better understood by referring to the accompanying drawings, in which—

Figure 2:
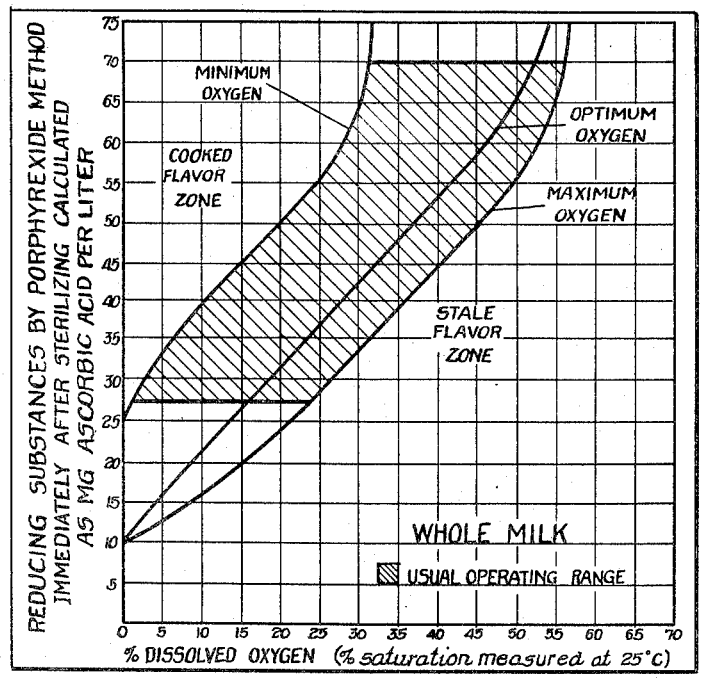
Figure 2 is a chart on which is shown the minimum, optimum, and maximum amounts of oxygen to be employed in carrying out the present invention when processing whole milk.
Figure 3:
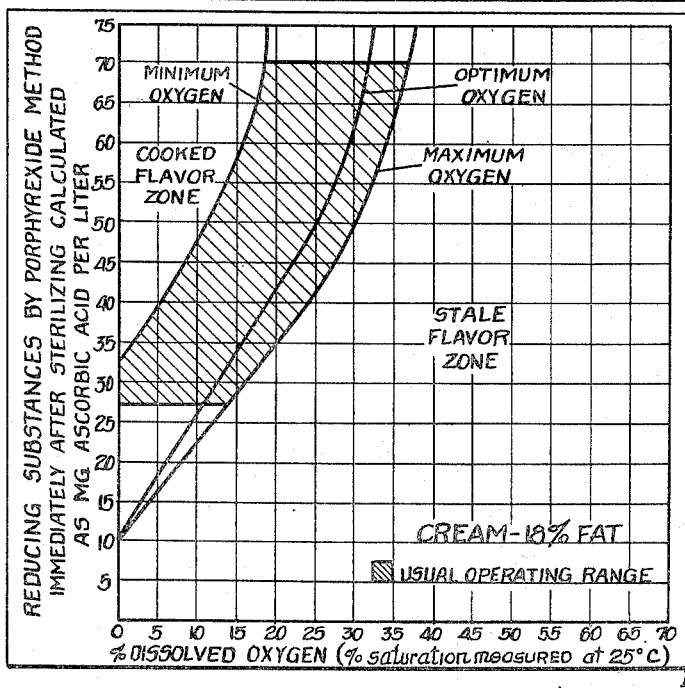
Figure 3 is a similar chart showing the minimum, optimum, and maximum amounts of oxygen to be employed when processing cream.

Reference to Figures 2 and 3 of the drawing and the line marked "Optimum oxygen" discloses that the quantity of free oxygen present in the fluid for operative results may have a value of from substantially 15% saturation to substantially 50% saturation at 25° C.

Also referring to Figures 2 and 3, it will be observed that the reducing substances or groups are in quantity for operative results of the order from substantially 25 mg. to substantially 70 mg. computed as ascorbic acid per liter of fluid.

Figure 1:
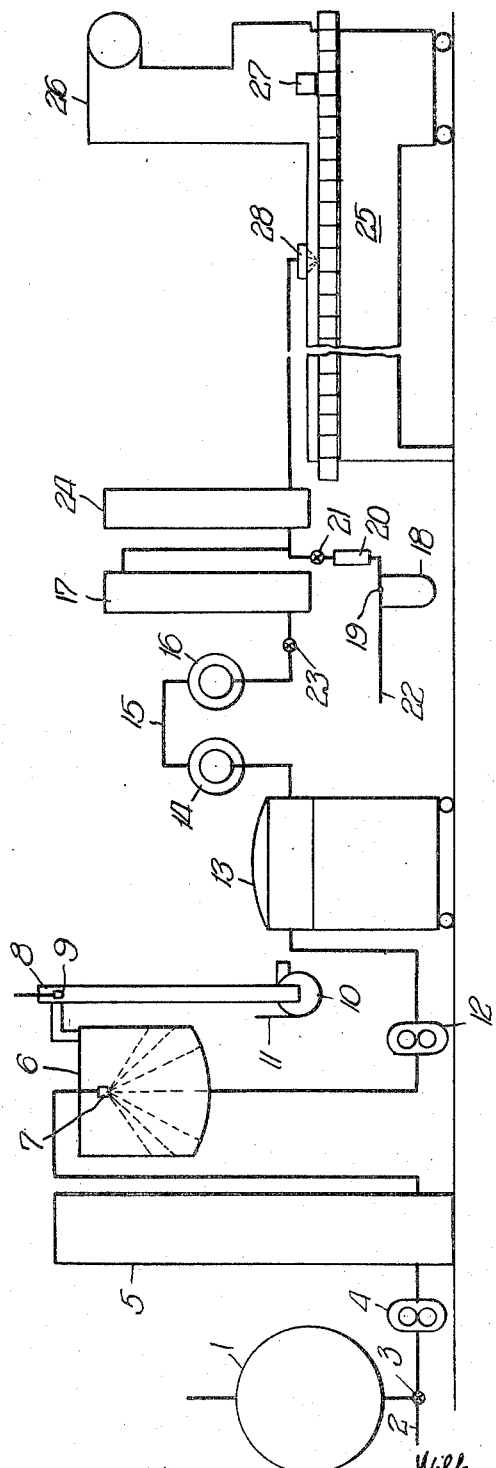
Figure 1 is a schematic view in elevation showing apparatus employed in carrying out the process of this invention.

By referring to Figure 1, it will be noted that the invention may be practiced by placing the substance to be treated, such as whole milk, in tank 1. The milk employed in this example may contain 4% butterfat and 8.7% milk solids not fat. The milk is held in the tank 1 at approximately 40° F. The tank 1 is preferably connected to a three-way valve 3 which in turn is connected to a water line 2 on one side and to a pump 4 on the other side. The discharge of the pump 4 leads to a preheater 5, which in this instance is of the tube and shell construction. The discharge of the preheater feeds to a deaerator 6 having a spray nozzle 7 which discharges the liquid into the body of the deaerator. The top of the deaerator is connected to a vapor condenser 8 equipped with a water spray 9, vacuum pump 10, and a water seal line 11. The deaerator discharges at the bottom and is connected to a pump 12 which in turn discharges into a homogenizer 13 which, in this instance, is adapted to function at 5000 pounds per square inch pressure.

The discharge of the homogenizer leads to a sterilizing heater 14 which discharges into a holding pipe or tube 15. The holding pipe feeds into a cooler 16 of the agitated barrel type and thence into a pair of coolers 17 and 24, respectively, of the shell and tube type. The line connecting the coolers 17 and 24 has a source of air intake connected thereto, which in this instance is represented by the air inlet pipe 22 and flowmeter manometer 18 having a flowmeter orifice 19. In addition, there is connected in the line a sterile cotton filter 20 and a sterile needle valve 21. The valve 23 is located between the coolers 16 and 17 for the purpose of maintaining pressure for sterilizing temperatures. The outlet of the cooler 24 connects directly with the filler head 28 of an aseptic canning unit, represented generally at 25. At 26 is illustrated the seamer for the aseptic canning unit, and the position of the can while being seamed is represented at 27.

The milk stored in tank 1 at approximately 40° F. is run through the tubular preheater 5 which heats the milk to approximately 190° F., immediately following which the milk is sprayed into the deaerator 6. In this illustration, the vacuum chamber of the deaerator is maintained at a vacuum of approximately 16½ inches of mercury. The temperature of the milk is lowered to about 178° F. and becomes completely deaerated as a result of the above-described treatment. When conducted properly, the milk will show 0% oxygen content upon analysis. The deaerated milk is next continuously pumped from the deaerator to the homogenizer 13, where it is homogenized at approximately 5000 pounds of pressure per square inch. The milk in the homogenizer then continuously passes through a sterilizer heater 14 where the temperature is raised to approximately 285° F. The milk then passes through a previously sterilized holding pipe where the milk is maintained at sterilizing temperature for approximately one second, and from which it passes into a previously sterilized cooler. In this instance, the cooler is represented by the barrel cooling device 16 and the tube and shell cooler 17.

Under the conditions above set forth for sterilization and taking into account the come-up time and type of heater employed, the sterilization value produced was $F_0=10.2$. This sterilization value is safely above that which is necessary to insure complete sterilization of the milk.

According to the teachings of this invention, based on prior experimental and test work, it is now known that under such conditions the amount of cooked flavor reducing substances present would be approximately 44 mg. per liter (see chart in Figure 2). Accordingly, sterile air is injected into the milk at the inlet to cooler 24, with the rate of air addition being controlled by needle valve 21 and measured by flowmeter 18 in such manner as to cause the milk to become between 25% and 35% saturated with oxygen, when measured at 25° C. The 25% to 35% saturation value is determined by the showing of the chart in Figure 2 and represents the amount of oxygen discovered to be sufficient to react with 44 mg. per liter cooked flavor reducing substances to the extent that the cooked flavor will be lowered to the point where it is not objectionable to the consumer, yet at the same time the amount of oxygen so selected is not excessive such as would cause the development of stale flavors upon storage for several months. After the addition of air in the desired quantity, the milk is further cooled to approximately 60° F. in the previously sterilized tubular cooler 24, and is then canned aseptically in a suitable aseptic canning machine. In this particular instance, the machine described and claimed in United States Letters Patent No. 2,549,216, issued April 17, 1951, to William Martin has been employed with success.

Milk processed as above described, when analyzed, showed a finished canned product 26% saturated with oxygen when measured at 25° C., and contained 44 mg. of reducing substances per liter. On storage at 72° F., the amount of reducing substances remaining after reaction with the oxygen present was 23 mg. per liter, which reaction was essentially complete in three weeks. The cooked flavor after three weeks storage and thereafter for storage periods up to six months (which was the extent of the test) at 72° F. was judged to be 1+, or so slight as to be considered acceptable to most consumers for beverage purposes. Furthermore, no staling could be detected from samples stored for four months at 72° F. and only very slight staling could be noticed after 6 months of storage at 72° F. The very slight staling present after six months of storage was judged to be unobjectionable and undetectable by the average consumer.

Sterilization conditions can be altered if desired to give initial reducing substance values of from 42 mg. to 70 mg. per liter and thereafter air added as desired within the limits illustrated in the charts of Figures 2 and 3. In such case, the milk preferably would be deaerated prior to sterilization and air injected under controlled, calculated conditions in the manner described in connection with the above illustrative example. In all instances, the flavor and keeping quality of the milk will be found to be satisfactory if the teachings of this disclosure are followed. When air is added in amounts outside the limits shown on the charts, the resulting product will be either too cooked under conditions where too little oxygen is incorporated, or will be subject to the development of a stale flavor where too much oxygen is added.

It is to be understood that pure oxygen may be used instead of air, provided it is employed in equivalent amounts.

It is not necessary to completely deaerate the milk prior to sterilization. When this is not done, the amount of reducing substances in the milk leaving the sterilizer is lower than when the milk is first completely deaerated. This is because the reaction of reducing substances with oxygen occurs simultaneously with the production of such substances during sterilization. When milk is sterilized without first completely deaerating it, the amount of air or oxygen needed to be injected is somewhat less for the reason that the reducing substances present are less. It is then necessary to determine the reducing substances present after sterilization and make certain that the proper amount and only the proper amount of oxygen is present to react with these reducing substances.

Thus it is a possibility to partially deaerate, or to deaerate and inject air, prior to sterilization so that the amount of air reacting during sterilization plus that reacting after sterilization is sufficient to reduce cooked flavor but not in excess to cause staling. The proper amount of oxygen can always be calculated by means of the data set forth in this disclosure.

Deaeration before sterilization and injection of air or oxygen after sterilization provide the following benefits—

(a) Sterilization in the presence of air or oxygen is more destructive of vitamin C (ascorbic acid) as compared with 72° F. storage in the presence of air or oxygen; and (b) Deaeration after sterilization avoids the use of sterile deaeration equipment, which is more difficult to manage.

Also, it is preferred to use sterilization conditions which produce less amounts of reducing substances than to use excessively high temperatures and longer holding times, or either thereof, which produce larger amounts of reducing substances. In other words, it is better to use sterilizing conditions which are not excessively greater than those required to sterilize the product. The reasons for this preferential treatment are—

(a) Excessive heat is likely to give a brown color to the milk; and (b) there is some indication that when initial reducing substances are high and necessitate high additions of air or oxygen to produce the oxidized or non-cooked flavor form, the relatively large amounts of this oxidized form can in turn react with substances in milk to give stale flavor. At least it has been noticed that when initial reducing substances are high, for example, above 60 mg. per liter, it is more difficult to achieve a satisfactory low cooked flavor without staling occuring in storage. This latter difficulty is quite noticeable at 120 mg. per liter.

In the practice of this invention, the following formula can be used in calculating the reaction of milk:

[Final R. S.] = [Original R. S.] × [1 = (.0068 × Original R. S.] − [.28 × (percent $O_2$ saturation at 25° C.)]

This invention, however, may be applied to various types of product, such as milk and cream or similar dairy products. Inasmuch as some variation in the process is indicated as applied to cream, some comments on this subject will now be made.

The same basic factors established for whole milk have been found to apply to the processing of cream, with the following alteration: "Cream" as here used means a product containing approximately 18% butterfat.

Oxygen is more efficient in reacting with reducing substances in cream, and therefore less oxygen is required when processing cream than when processing milk. The chart of Figure 3 gives the amount of oxygen required for the best results when processing cream. For cream having less than 18% butterfat, say, for instance, 11.7% fat as in the product commonly termed "half-and-half," the amount of oxygen to be employed would reside midway between the quantities illustrated in the charts of Figures 2 and 3, respectively, for any particular initial reducing substance level.

The following formula can be used in calculating the relationship between original reducing substances and the amount which will react with oxygen:

[Final R. S.] = [Original R. S.] × [1 − (.0068 × Original R. S.)] − [.6 × (percent $O_2$ saturation at 25° C.)]

In addition to the foregoing, it should be known that hydrogen peroxide injections in the milk have been found to function in a manner similar to air or oxygen, insofar as lowering the cooked flavor without staling is concerned. However, the use of hydrogen peroxide is not as satisfactory since there is a tendency for the $H_2O_2$ to cause the milk to have a brownish-pink color and to give to the milk a foreign taste simulating sunlight flavor. The creation of sunlight flavor is particularly noticeable at high levels of addition. One advantage, however, resulting from the use of $H_2O_2$ is that the reaction of the reducing substances is more rapid than is the reaction produced by oxygen.

Applicants are aware of the fact that copper sulfate, as has been reported in the literature, is a substance capable of reacting with cooked flavor reducing substances. However, the use of copper sulfate is not satisfactory for carrying out this invention, particularly at levels of high addition (2 p. p. m.), since it gives a foreign taste simulating a sour taste. However, $Cu^{++}$ may be used in small amounts to catalyze the reaction of reducing substances with oxygen.

It may be theoretically possible in some instances, where the practice is to deaerate and can air-free liquid, that air be introduced into the aseptic canning equipment and become part of the headspace. This air could possibly be in correct amounts to react with the reducing substances on storage in a similar manner to when the air is injected into the milk prior to canning. However, this would be more difficult to achieve since exact control of the proper ratio between air in the headspace and liquid volume is difficult.

It should be stated that even in the absence of air or oxygen there is substantial loss in cooked flavor during storage which can also be determined by porphyrexide reducing substance analysis. However, this decrease in cooked flavor must be supplemented by reaction with oxygen to achieve sufficiently low cooked flavor in most instances. The formulas given on pages 17 and 18 and the charts of Figures 2 and 3 take into account both the decrease in reducing substances (cooked flavor) occurring from reaction with oxygen and from other reactions not requiring the presence of free dissolved oxygen.

In all cases where reference is made to porphyrexide reducing substances, the natural ascorbic acid in the milk is included in the values. In the cases of whole milk and cream on which our data were developed, the natural reduced ascorbic acid content was 12.5 to 16 mg. per liter, fluid skim milk basis, or, in other words, 12.5 to 16 mg. per 90 grams milk solids not fat, in the freshly prepared sample before storage. The average was 14 mg. The rest of the reducing substances (the total minus reduced ascorbic acid) constitutes true cooked flavor reducing substances.

It was believed best to include reduced ascorbic acid in the porphyrexide reducing substance values, however, since it was found that the reduced ascorbic acid in milk influences the amount of oxygen required to reduce cooked flavor. This is in spite of the fact that each 10% of dissolved oxygen in milk will oxidize only about 0.5 mg. reduced ascorbic acid per liter at 72° F. storage and thus, by our preferred procedure the reduced ascorbic acid retention is considered excellent.

If anyone should use milk with higher or lower natural ascorbic acid content, the calculations for amount of oxygen required, based on total reducing substances, should still be valid.

It is the usual practice to withdraw the air in the head space of the can when the finished product is canned. In this way, no oxygen or air is left in contact with the product over and above that which has been introduced by the procedure constituting this invention. It is to be understood, however, that instead of following the usual practice of removing the air in the head space, predetermined amounts of air can be left in the head space provided that allowance is made therefor during the practice of the invention. It is found that when air is left in the head space of the cans it ultimately reacts with the reducing substances on storage in a manner similar to that which occurs when the air is injected into the milk prior to canning.

In the following claims, reference is made to reducing substances produced in the product as a result of the sterilization treatment, and it is the reducing substances so produced which are responsible for the cooked flavor and which are to be eliminated by the oxidizing process characteristic of this invention. Accordingly, reference in the claims to "reducing substances produced as a result of the sterilization treatment" is not to be construed as including naturally present ascorbic acid, and therefore the claims are to be read on a basis excluding from the quantities of reducing substances referred to, the quantities of natural ascorbic acid present.

In the following claims reference is made to "free oxygen" and it is to be understood that this term includes all forms and sources of free oxygen including molecular oxygen as well as air and other oxygen-bearing gases.

What is claimed is:

1. The process of rendering fluid milk products sterile and at the same time relatively free from cooked flavor and the tendency to develop a stale flavor which comprises deaerating the fluid to substantially free it from oxygen, homogenizing the deaerated fluid, sterilizing the fluid by raising the temperature to above 265° F., holding it at such temperature for a period of time, less than two minutes, such as is sufficient to produce an F. value above 5, cooling the fluid and adding oxygen thereto substantially equivalent to the predetermined cooked flavor producing reducing substances present which are created by the sterilization and sealing the treated fluid in sterile containers under aseptic conditions.

2. The process of rendering fluid milk products sterile and at the same time relatively free from cooked flavor and the tendency to develop a stale flavor which comprises preheating the fluid product to a temperature of approximately 190° F., deaerating the fluid to substantially free it of oxygen, homogenizing the deaerated fluid, sterilizing the fluid by raising the temperature thereof to approximately 285° F. for a period of the order of eight seconds, cooling the fluid and adding oxygen thereto substantially equivalent to the predetermined cooked flavor producing reducing substances present which are created by the sterilization and sealing the treated fluid in a sterile container under aseptic conditions.

3. The process of rendering fluid milk sterile and at the same time relatively free from cooked flavor and the tendency to develop a stale flavor, which comprises preheating the fluid milk to a temperature of approximately 190° F., deaerating the fluid to substantially free it from oxygen, homogenizing the deaerated fluid, sterilizing the fluid by raising the temperature thereof to about 285° F. and for a time such that sterilizing conditions are productive of an $F_0$ of about 10, adjusting the relationship between the quantity of reducing substances present which are created by said sterilization treatment and the quantity of free oxygen so that they are substantially equivalent, 18% to 30% saturation with oxygen being optimum, and sealing the treated fluid milk in a sterile container with said free oxygen to combine with the reducing substances to diminish the free oxygen to a quantity insufficient to oxidize substances productive, when oxidized, of stale flavor in such quantity as will result in the development of a stale flavor in said product.

4. The process of rendering fluid milk products sterile and at the same time relatively free from cooked flavor and the tendency to develop a stale flavor which comprises partially deaerating the fluid to reduce the content of free oxygen to an amount less than sufficient to oxidize the reducing substances created by the subsequent sterilization step, sterilizing the fluid by high temperature short time sterilization to an $F_0$ of at least 5, cooling the fluid and adding oxygen thereto to that present in the fluid so that the total oxygen present is substantially that required to oxidize the predetermined cooked flavor producing reducing substances present created by the sterilization and sealing the treated fluid in sterile containers under aseptic conditions.

5. The process of rendering fluid milk products sterile and at the same time relatively free from cooked flavor and the tendency to develop a stale flavor, which comprises the steps of adjusting the quantity of free oxygen present in said fluid to a value of from substantially 15% saturation to substantially 50% saturation, and sterilizing the milk product, prior to canning, by heating the same to a temperature not lower than 265° F. for a period of time productive of an $F_0$ value of at least substantially 5, and producing as a result of such sterilization, reducing groups in quantity in the order of from substantially 25 mg. to substantially 70 mg., computed as ascorbic acid per liter of fluid, with the result that the free oxygen present is sufficient to oxidize said reducing groups to an extent materially to reduce the cooked flavor produced by said sterilization treatment and yet, upon substantial completion of said oxidation, any free oxygen remaining, is insufficient in quantity to oxidize substances productive, when oxidized, of stale flavor in such quantity as will result in the development of a stale flavor in said product, and finally sealing the treated fluid in sterile containers under aseptic conditions.

References Cited in the file of this patent
UNITED STATES PATENTS

| | | |
|---|---|---|
| 498,645 | Grader | May 30, 1893 |
| 622,659 | Bendixen | Apr. 11, 1899 |
| 626,486 | Clerc | June 6, 1899 |
| 906,532 | Jensen | Dec. 15, 1908 |
| 1,036,806 | Desmaroux | Aug. 27, 1912 |
| 2,207,817 | Parker et al. | July 16, 1940 |
| 2,482,724 | Baker | Sept. 20, 1949 |